United States Patent [19]

Hoshimi et al.

[11] Patent Number: 4,974,109

[45] Date of Patent: Nov. 27, 1990

[54] HARD DISK DRIVE EMPLOYING A REFERENCE TRACK TO COMPENSATE FOR TRACKING ERROR

[75] Inventors: Susumu Hoshimi; Takayasu Muto, both of Kanagawa, Japan

[73] Assignee: Sony Corporation, Tokyo, Japan

[21] Appl. No.: 81,651

[22] Filed: Aug. 4, 1987

[30] Foreign Application Priority Data

Aug. 27, 1986 [JP] Japan .................................. 61-201140
Sep. 1, 1986 [JP] Japan .................................. 61-205713

[51] Int. Cl.⁵ ............................................. G11B 5/596
[52] U.S. Cl. ......................... 360/077.110; 360/77.030;
360/77.040; 360/78.110
[58] Field of Search ............. 360/77, 78, 77.02, 77.03,
360/77.04, 77.07, 78.11, 78.04, 77.11, 77.08,
78.14; 318/634

[56] References Cited

U.S. PATENT DOCUMENTS

| | | | |
|---|---|---|---|
| Re. 32,075 | 2/1986 | Brown et al. ..................... | 360/77.08 |
| 3,737,883 | 6/1973 | Sordello et al. . | |
| 3,753,254 | 8/1973 | Ruble et al. ............................. | 360/77 |
| 3,775,655 | 11/1973 | DuVall ..................................... | 360/77 |
| 3,812,533 | 5/1974 | Kimura et al. . | |
| 3,881,184 | 4/1975 | Koepcke et al. . | |
| 3,924,268 | 12/1975 | McIntosh et al. ..................... | 360/78 |
| 3,994,016 | 11/1976 | Moghadam ............................ | 360/77 |
| 4,056,831 | 11/1977 | Godbout et al. ...................... | 360/77 |
| 4,122,503 | 10/1978 | Allan ...................................... | 360/78 |
| 4,136,365 | 1/1979 | Chick et al. ............................ | 360/78 |
| 4,149,199 | 4/1979 | Chick et al. ............................ | 360/77 |
| 4,396,959 | 8/1983 | Harrison et al. .................. | 360/77.03 |
| 4,419,701 | 12/1983 | Harrison et al. .................. | 360/78.11 |
| 4,620,244 | 10/1986 | Krause .................................... | 360/77 |
| 4,660,106 | 4/1987 | Harrison et al. ...................... | 360/77 |
| 4,697,213 | 9/1987 | Kitamura ............................... | 360/78 |
| 4,731,680 | 3/1988 | Moriyama et al. ................... | 360/78 |
| 4,814,909 | 3/1989 | Brown et al. ..................... | 360/78.07 |
| 4,819,095 | 4/1989 | Asano et al. ...................... | 360/77.04 |

FOREIGN PATENT DOCUMENTS

| | | | |
|---|---|---|---|
| 49-117007 | 11/1974 | Japan ..................................... | 360/78 |
| 60-191481 | 9/1985 | Japan . | |
| 61-122977 | 6/1986 | Japan . | |

OTHER PUBLICATIONS

IBM TDB, vol. 19, No. 6, "Self Calibrating Disk Storage Apparatus" Griffiths et al. 11/76, pp. 1991–1992.

Primary Examiner—Aristotelis M. Psitos
Assistant Examiner—Steven R. Garland
Attorney, Agent, or Firm—Philip M. Shaw, Jr.

[57] ABSTRACT

A magnetic disc apparatus wherein off-track quantities are stored with regard to reference servo tracks formed circularly in divided data areas on a magnetic disc and, at the time of displacing the magnetic head, the head is shifted an extent of the stored off-track quantity after being once positioned by a head position detector. Gradients of the off-track quantities corresponding to tracks at individual temperatures in the apparatus are previously stored and, after the actual temperature is detected by means of a temperature sensor, the off-track quantity relative to the reference servo track is corrected in accordance with the gradient of the off-track quantity to the relevant track at the detected temperature, whereby just tracking is achieved. The magnetic head can be positioned exactly with respect to a desired data track while the head displacement time is shortened. Furthermore, data can be written in the entire length of each circular data track to enhance the efficiency of utilizing the magnetic disc, and high-precision tracking is attainable with the off-track quantity reduced to zero in any data track.

7 Claims, 5 Drawing Sheets

HARD DISK DRIVE EMPLOYING A REFERENCE TRACK TO COMPENSATE FOR TRACKING ERROR

BACKGROUND OF THE INVENTION

1. Field of the Invention

The present invention relates to a magnetic disc apparatus for use in controlling the operation of a magnetic head with respect to a target data track or the like.

2. Description of the Prior Art

Relative to servo systems for controlling the position of a magnetic head with respect to a target data track, there have been proposed a variety of methods heretofore, including a sector servo system and a servosurface servo system.

In the sector servo system, as disclosed in FIG. 2 of U.S. Pat. No. 3,812,533, a multiplicity of data tracks are arrayed on a magnetic disc, and servo tracks are so formed that one is existent in a circumferential portion of each data track.

Meanwhile in the servo-surface servo system, as disclosed in FIG. 1 of U.S. Pat. No. 4,072,990, servo tracks are formed on one entire surface of one of the magnetic discs superposed with a predetermined space.

It is also known that, as described in U.S. Pat. No. 3,737,883 and so forth, an external position sensor such as an optical sensor is employed to perform a seek operation before reading out a servo signal written on a disc.

In the sector servo system where control is executed for each of the sectors individually, a rotation waiting time is needed until a desired sector arrives and a servo signal is read out therefrom, so that the required displacement time of the head is rendered long.

Furthermore, since a servo track is formed in a circumferential portion of each data track, it is impossible to write the data in the entire circumferential length of the data track, and a margin is required for embedding a servo pattern.

Meanwhile in the servo-surface servo system where one whole surface of a magnetic disc is used for servo tracks, the utilization efficiency of the magnetic disc is low with regard to the data tracks.

SUMMARY OF THE INVENTION

The present invention has been accomplished in view of the circumstances mentioned above. And its object is to provide an improved magnetic disc apparatus which is capable of shortening the head displacement time and writing data in the entire length of each circular track while eliminating the necessity of using one whole surface of a magnetic disc exclusively for servo tracks to consequently ensure a high utilization efficiency of the disc and high-precision tracking.

In a magnetic disc apparatus wherein a magnetic head is positionally controlled in response to a reference servo signal prerecorded on a magnetic disc after being positioned roughly with respect to a target data track by a head position detecting means which produces a periodic output signal, the feature of the present invention resides in dividing the magnetic disc into a plurality of data areas; forming, in the data areas respectively, a plurality of circular reference servo tracks corresponding to the periodicity of the output signal of the head position detecting means; storing an off-track quantity relative to each of the reference servo tracks in the data areas individually; and, at the time to displace the magnetic head, first positioning the magnetic head by the head position detecting means and then shifting the head an extent of the stored off-track quantity to achieve just tracking, hence realizing expedited displacement of the magnetic head and writing of data in the entire length of each circular data track while ensuring high-precision tracking with the off-tracking quantity reduced to zero in any data track.

Another feature of the present invention resides in previously storing a relationship between temperatures in the magnetic disc apparatus and gradients of the off-track quantities to tracks, then detecting the actual temperature by means of a temperature sensor, and correcting the off-track quantity relative to the reference servo track on the basis of the gradient read out in accordance with the detected temperature, thereby executing tracking servo control to position the head with enhanced precision.

In the apparatus of the present invention, off-track quantities are stored with regard to reference servo tracks formed circularly in data areas on a magnetic disc and, at the time to displace a magnetic head, the head is shifted an extent of the stored off-track quantity after being once positioned by a head position detecting means. Furthermore, gradients of the off-track quantities to tracks at individual temperatures are previously stored and, after the actual temperature is detected by means of a temperature sensor, the off-track quantity relative to the reference servo track is corrected in accordance with the gradient of the off-track quantity to the relevant track at the detected temperature.

The magnetic disc is divided into a plurality of data areas. And a plurality of reference servo tracks corresponding to the periodicity of the output signal of the head position detecting means are formed to be circular in the data areas respectively. In case the output signal of the head position detecting means has a periodicity of four phases with 90° shift, four reference servo tracks are formed in the shape of complete circles. Relative to each of such reference servo tracks in the data areas, there is stored in the memory of a microprocessor an off-track quantity which represents the difference between the position of the magnetic head where the output of the head position detecting means becomes zero and another position of the head set by the servo signal. The actual temperature is detected by means of a temperature sensor, and the off-track quantity relative to the reference servo track is corrected in accordance with the previously stored gradient of the off-track quantity to the track at the detected temperature. And when the magnetic head is moved for reading or writing the data, first the head is so positioned that the output of the head position detecting means becomes zero, and then the head is displaced an extent of the corrected off-track quantity, whereby just tracking is attained. Thus, the magnetic head can be positioned exactly with respect to a desired data track while the head displacement time can be shortened. Furthermore, it becomes possible to realize writing of data in the entire length of each circular data track to enhance the efficiency of utilizing the magnetic disc. And high-precision tracking can be attained with the off-track quantity reduced to zero in any data track.

Other advantages of the present invention will become manifest to those versed in the art upon making reference to the detailed description and the accompanying drawings in which a preferred embodiment incorporating the principle of the present invention is shown by way of illustrative example.

DETAILED DESCRIPTION OF THE PREFERRED EMBODIMENT

Hereinafter an exemplary embodiment of the present invention will be described in detail with reference to FIGS. 1 through 7.

Figure 1:
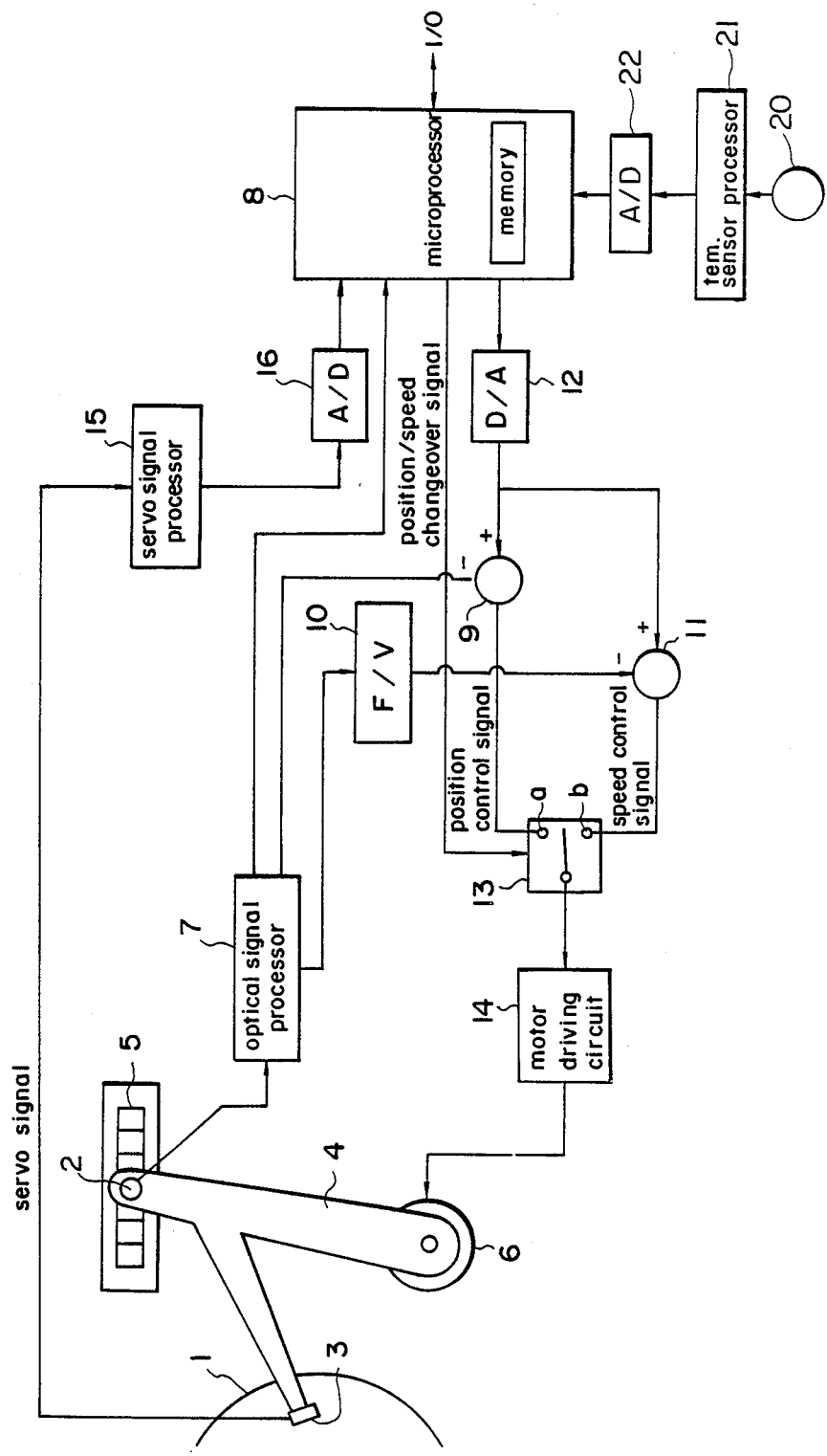
FIG. 1 is a circuit block diagram of an exemplary apparatus embodying the present invention.
Figure 2:
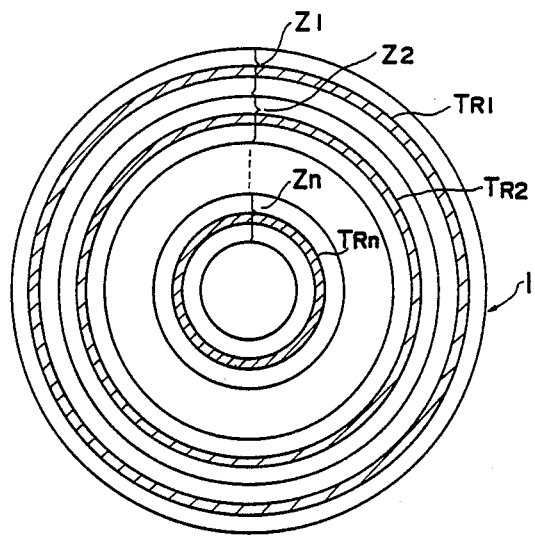
FIGS. 2 through 7 are diagrams for explaining the invention.

FIG. 1 shows a circuit configuration of the embodiment with a magnetic disc 1 serving as a recording medium. Entire tracks of the magnetic disc 1 are divided into n pieces of data areas Z1, Z2 ... Zn as illustrated in FIG. 2, and a plurality of reference servo tracks $T_{R1}$, $T_{R2}$... $T_{Rn}$ equivalent to the periodicity of an optical sensor 2 constituting a position detecting means are formed in such data areas Z1, Z2 ... Zn differently from the data tracks where position detecting signals are written.

Figure 3:
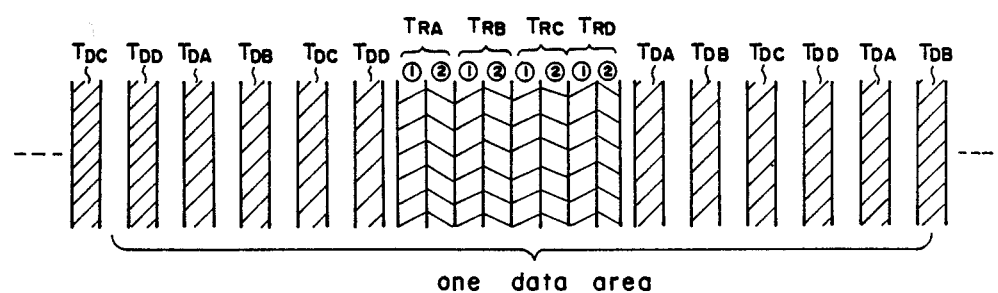
Figure 4:
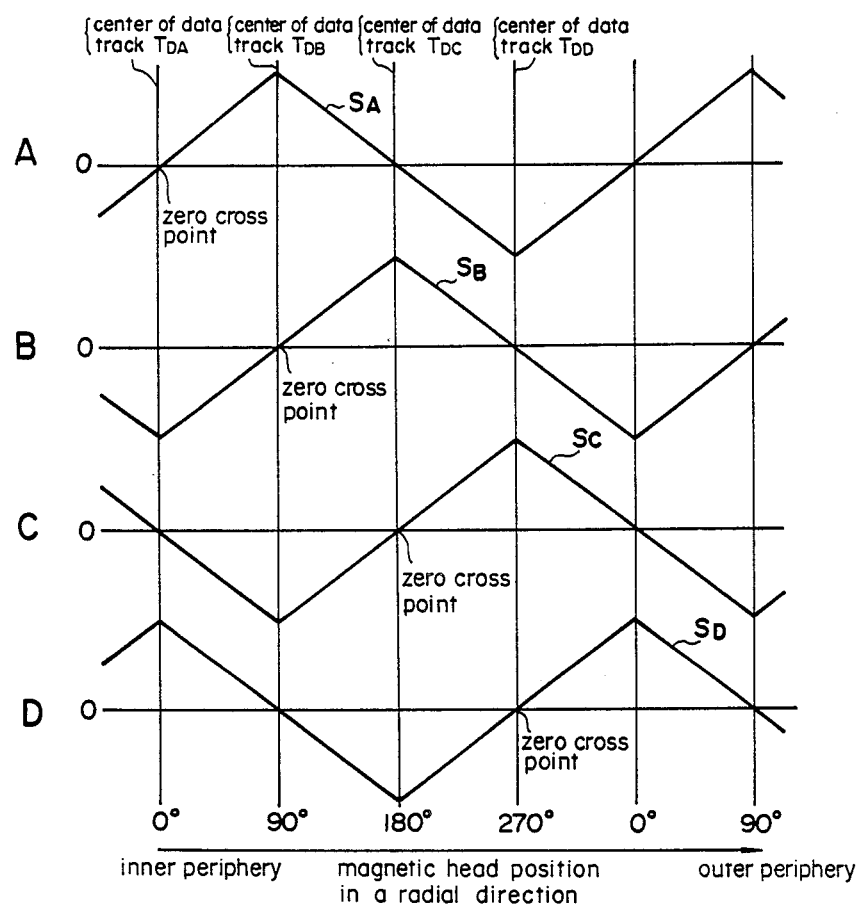

Supposing now that the optical sensor 2 generates output signals SA, SB, SC, SD of four phases mutually having a 90° phase difference as shown in FIG. 4 and also that each of the output signals has a four-track period, then four reference servo tracks $T_{RA}$, $T_{RB}$, $T_{RC}$, $T_{RD}$ are formed in the data areas corresponding to the periodicity of the signals as shown in FIG. 3. In this example, each of the reference servo tracks $T_{RA}$-$T_{RD}$ is composed of two tracks ①and②. And data tracks $T_{DA}$, $T_{DB}$, $T_{DC}$, $T_{DD}$ are formed on the two sides of the reference servo tracks $T_{RA}$-$T_{RD}$. Such tracks $T_{DA}$, $T_{DB}$, $T_{DC}$, $T_{DD}$ correspond respectively to the four-phase output signals SA, SB, SC, SD of the optical sensor 2, and the rightascending zero cross point of the signal SA corresponds to the center of the data track $T_{DA}$ (which does not signify a single data track but represents a group of tracks repeated in a four-track period). Similarly, out of the zero cross points of the signals SB, SC and SD, right-ascending points correspond to the centers of the data tracks $T_{DB}$, $T_{DC}$ and $T_{DD}$ respectively. Here, the track width of ① and ② of the reference servo tracks TRA—TRD is supposed to be substantially equal to the track width of the data tracks TRA—TDD, and a tri-bit servo pattern or the like is recorded.

There are also shown a magnetic head 3 which is attached to an arm 4 together with the optical sensor 2 and scans the tracks on the magnetic disc 1; an optical scale 5; and an actuator motor 6. The optical sensor 2 in this example comprises four light sensitive elements and reticle elements disposed in front thereof with a 90° phase difference maintained. One light emitting element (not shown) is disposed correspondingly thereto on the reverse side of the optical scale 5. As the arm 4 is driven by the motor 6, the optical sensor 2 attached to the arm 4 is moved along the optical scale 5, and simultaneously the magnetic head 3 is also moved on the magnetic disc 1 in accordance with displacement of the optical sensor 2.

With such motion of the arm 4, slits in the reticle elements and those in the optical scale 5 are repeatedly brought into and out of positional coincidence, whereby output signals SA, SB, SC, SD are produced from the four light sensitive elements.

The output of the optical sensor 2 is fed to an optical signal processor 7 for amplification and so forth and then is fed to a microprocessor 8. In this embodiment, one pulse signal is fed from the optical signal processor 7 to the microprocessor 8 per scanning of one track by the magnetic head 3.

The output signal of the optical signal processor 7 is fed to one input of a subtracter 9 while being fed also to a frequency/voltage converter 10, where the frequency signal is converted into a voltage signal and then is fed as speed information to one input of a subtracter 11.

Denoted by 12 is a D/A converter where the digital output signal of the microprocessor 8 is converted into an analog signal, which is then fed to the other inputs of the subtracters 9 and 11 so that subtraction of the two input signals is executed therein. As a result, the subtracter 9 generates a position control signal while the subtracter 11 generates a speed control signal, and such two input signals are fed to contacts a and b of a switch circuit 13 respectively.

The switch circuit 13 is selectively changed by a position/speed changeover signal obtained from the microprocessor 8. The apparatus operation is so switched that a position control mode or a speed control mode is selected when the switch circuit 13 is connected to the contact a or b, respectively.

The control signal passed through the switch circuit 13 is fed to a motor driving circuit 14, which then produces an output signal to drive the motor 6 under control.

During the scanning of reference servo tracks by the magnetic head 3, a servo signal is fed to a servo signal processor 15 which detects the difference between the two signals obtained from the reference servo tracks ① and ②. Such difference in the form of an analog signal is converted by an A/D converter 16 into a digital signal, which is then fed to the microprocessor 8.

There are further shown a temperature sensor 20 installed in the apparatus in connection with the micro processor 8, a temperature sensor processor 21 for amplifying the output of the temperature sensor 20, and a A/D converter 22 for converting the output analog signal of the temperature sensor processor 21 into a digital signal and feeding the latter to the microprocessor 8.

As will be described later, the microprocessor 8 previously stores in its memory gradients of the off-track quantities to the tracks at individual temperatures.

Now the circuit operation performed in FIG. 1 will be described below.

When the power supply is initially switched on, seek commands to the reference servo tracks TR1, TR2 ... TRn formed in the data areas are outputted sequentially from the microprocessor 8, and the switch circuit 13 is connected to the contact b in response to the position/speed changeover signal from the microprocessor 8, whereby a speed control mode is selected. A speed reference value is given from the microprocessor 8 to the D/A converter 12, and the corresponding output signal of the D/A converter 12 is fed to the other input of the subtracter 11. And simultaneously the output signal of the optical sensor 2 is fed via the optical signal processor 7 to the frequency/voltage converter 10, whose output speed signal is fed to one input of the subtracter 11 so as to be subtracted from the signal corresponding to the preceding speed reference value. And the error voltage thus obtained is fed via the motor driving circuit 14 to the motor 6 for rotating the same, whereby the magnetic head 3 attached to the arm 4 is moved to the vicinity of the first reference servo track such as TRA in the data area Z1. And track pulses are counted successively so that the magnetic head 3 is driven into the target reference servo track.

Subsequently the switch circuit 13 is changed to the contact a in response to the position/speed change-over signal from the microprocessor 8, whereby a position control mode is selected. A position reference value is given from the microprocessor 8 to the D/A converter 12, and the corresponding output signal of the D/A converter 12 is fed to the other input of the subtracter 9. The position reference value given first in this stage is 0. And simultaneously the output signal of the optical sensor 2 is fed via the optical signal processor 7 to one input of the subtracter 9 so as to be subtracted from the signal corresponding to the preceding position reference value. Depending on which of the four reference servo tracks TRA, TRB, TRC, TRD is an object of the seek command, the optical signal processor 7 selects one of the four-phase output signals of the optical sensor 2. And the error voltage thus obtained is fed via the motor driving circuit 14 to the motor 6 for rotating the same, so that the magnetic head 3 attached to the arm 4 is moved and brought to a halt at a position where the error voltage becomes zero, i.e. on the reference servo track related to the seek command. However, such position is not coincident with the track center due to some variations including thermal expansion of the magnetic disc 1, arm 4 and optical scale 5.

Subsequently the servo signal prerecorded on the magnetic disc 1 is detected by the magnetic head 3 and, after being processed by the servo signal processor 15, the signal is fed to the A/D converter 16 which converts the analog signal into a digital signal. Then the digital signal is fed to the microprocessor 8 which calculates the deviation from the center of the actual reference servo track.

The microprocessor 8 computes an off-track quantity which is the difference between the optical center or the position of the magnetic head 3 where the output of the optical sensor 2 becomes zero and another position of the magnetic head 3 so determined by the servo signal that the detection outputs of the reference servo tracks ①and ②becomes zero. The off-track quantity thus computed is stored in a memory of the microprocessor 8.

Simultaneously, off-track quantities with regard to the second through fourth reference servo tracks are also computed, and furthermore those with regard to the reference servo tracks in the entire n pieces of data areas are computed and stored in the memory of the microprocessor 8.

In a seek operation for reading or writing the data, first the magnetic head 3 is moved to the designated data track by the output signal of the optical sensor 2, and the microprocessor 8 computes to find one of the data areas 1 through n and one of the four track periods to which the track posterior to such movement of the head relates. And the relevant off-track quantity is read out of those stored previously in the memory. The position reference value for the off-track quantity is given from the microprocessor 8 to the D/A converter 12, whose output signal is then fed via the subtracter 9 and the contact a of the switch circuit 13 to the motor driving circuit 14 which produces a driving signal to rotate the motor 6, thereby displacing the arm 4 slightly to move the magnetic head 3 an extent of the off-track quantity from the optical signal center corresponding to the position where the output of the optical sensor 2 becomes zero, so that the magnetic head 3 is placed in a just tracking state.

Since the off-track quantity changes depending on variations including ambient temperature fluctuation and so forth, the off-track quantity to be stored in the memory of the microprocessor 8 is renewed by accessing the reference servo track again in the two cases mentioned below.

①In seeking a desired data track, if no seek has been executed for more than a predetermined time in the past relative to the data area to which the desired data track belongs, the reference servo track for such data track is accessed and, after the off-track quantity to be stored is renewed by the servo signal, the magnetic head 3 is displaced to the desired data track and then is shifted slightly an extent of the renewed off-track quantity so as to achieve just tracking.

②In case the magnetic head 3 is positioned in one data track continuously for more than a predetermined time, the reference servo track for the data area related to such data track is accessed to renew the off-track quantity by the servo signal and, after return to the former data track, the magnetic head 3 is shifted slightly an extent of the renewed off-track quantity from the position set by the optical signal center, hence realizing a just-tracking state. For renewing the off-track quantity in the reference servo track of one data area, there are the following two procedures.

①The entire four reference servo tracks in one data area are accessed, and the off-track quantities thereof are renewed after calculation on the basis of servo signals.

②One of the four reference servo tracks in the data area is accessed as a representative, and the off-track quantity thereof is renewed. In this procedure, renewal of the off-track quantity is executed by first computing the difference between the previously stored off-track quantity of the representative reference servo track and the new off-track quantity obtained by the above access, and then adding the computed difference to the off-track quantity of the reference servo track in the data area.

Figure 5:
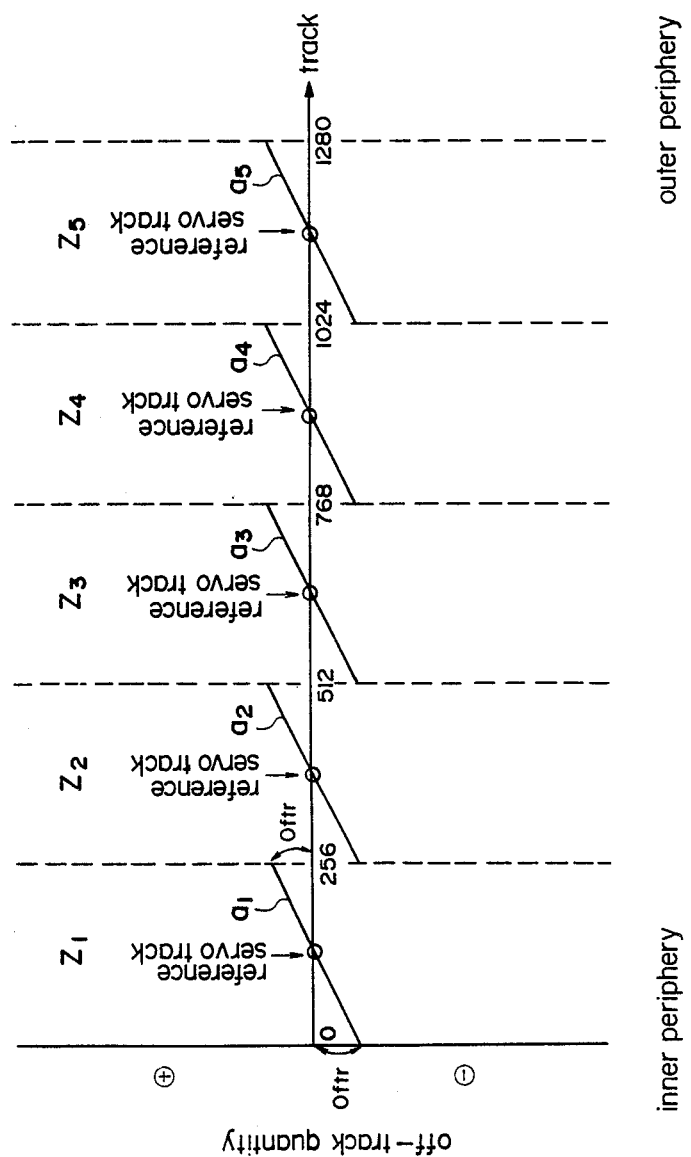

According to the above procedure which corrects the off-track quantity on the basis of a typical value representing the off-track quantity of the reference servo track in the data area, the off-track quantity oftr shown in FIG. 5 remains at each end of data areas Z1-Z5 in case the gradient of the off-track quantity to the track is varied by the temperature from the outer periphery of the magnetic disc 1 toward the inner periphery thereof. That is, in FIG. 5 showing the typical data areas Z1-Z5, a1-a5 denote changes in the off-track quantities after correction by the use of reference servo tracks. Although the off-track quantity is substantially zero at the position of each reference servo track, it gradually increases toward the end of the data area, and the maximum off-track quantity oftr remains at each end of the data areas Z1 - Z5. There is no problem if the off-track quantity oftr is an amount sufficiently permissible, but some contrivance is required when it is desired to eliminate such amount as well.

In the exemplary embodiment of this invention, gradients of the off-track quantities to the tracks at individual temperatures are previously stored in the memory of the microprocessor 8, and the actual temperature in the apparatus is detected by the temperator sensor 20. Then the stored gradient of the off-track quantity relative to the detected temperature is read out and, after computation is executed on the basis of such gradient of the off-track quantity to the relevant track, the off-track quantity obtained with regard to the reference servo track is corrected so that the off-track quantity can be reduced substantially to zero in any of the data tracks.

Figure 6:
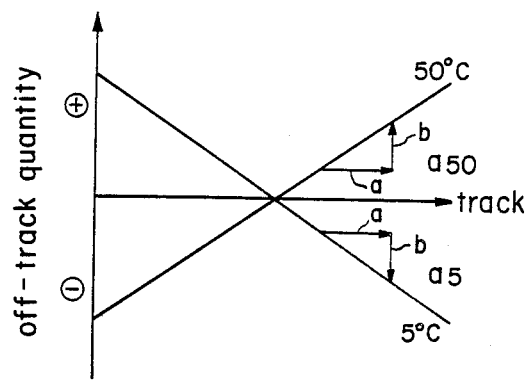

For the purpose mentioned, as graphically plotted in FIG. 6, first the gradients of the off-track quantities to tracks at individual temperatures are stored as information in the memory of the microprocessor 8. FIG. 6 shows typical gradients a50 and a5 of the off-track quantity to one track at 50° C. and 5° C., wherein arrows a and b represent a change in the number of tracks and a change in the off-track quantity, respectively. The gradients a50 and a5 of the off-track quantity to the track are computed from the change in the number of tracks and that in the off-track quantity, and the information thus obtained is stored previously in the memory of the microprocessor 8. It is assumed here that if the materials of the magnetic disc, arm, optical sensor and so forth are determined, the gradient of each off-track quantity is determined uniquely by a temperature.

Subsequently the actual temperature in the apparatus is detected by the temperature sensor 20, and the temperature information is fed to the microprocessor 8 via the processor 21 and the A/D converter 21. When the detected temperature in the apparatus is 50° C, for example, the microprocessor 8 computes the off-track quantity in the target track from the gradient a50 of the off-track quantity to the data track at 50° C.

Figure 7:
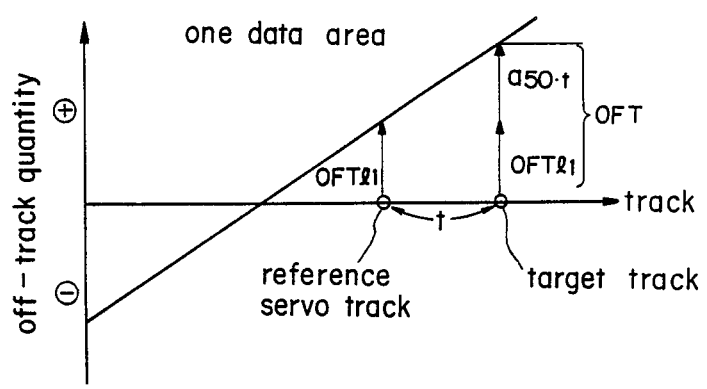

As shown in FIG. 7 where t denotes the number of tracks existing between the target track and the reference servo track in the data area to which the target track belongs, the microprocessor 8 discriminates the ordinal of one of m periods (four periods in this example) in which the target track is existent and, if it is in the lth period, the off-track quantity OFT in the target track is expressed as $$OFT = OFTl1 + a50 \times t$$

where OFTl1 is the off-track quantity relative to the lth reference servo track in the data area to which the target track belongs.

Therefore, after the magnetic head 3 is once displaced to the target track, the head 3 is further shifted slightly an extent of the calculated off-track quantity OFT from the position set at the zero cross point of the optical sensor 2, whereby a just-tracking state is achieved.

Thus, it becomes possible to reduce the off-track quantity substantially to zero in any data track to consequently ensure high-precision tracking.

Although the above embodiment is an example where four light sensitive elements are disposed for obtaining output signals of four phases from the optical sensor, it may be so modified as to employ two light sensitive elements and to obtain the remaining two output signals via inverters from such two light sensitive elements.

In case a plurality of magnetic discs are used, reference servo tracks may be formed on the individual magnetic discs as described above, or reference servo tracks may be formed merely on a single magnetic disc disposed at the center and such tracks may be utilized for access to data tracks on the remaining upper and lower magnetic discs.

As described hereinabove, according to the present invention where the off-track quantity stored previously is corrected at the time of displacing the magnetic head to achieve a just-tracking state, it becomes possible to ensure high-precision tracking with the off-track quantity reduced substantially to zero in any data track and also to eliminate the time that may otherwise be required until reading out a servo signal, thereby expediting the head displacement. Furthermore, data can be written in the entire length of each circular data track due to the nonexistence of any servo pattern in the data track, so that the efficiency of utilizing the magnetic disc surface is enhanced. In addition, the respective off-track quantities in the data areas can be corrected individually by disposing four reference servo tracks correspondingly to the four-phase output signals of the optical sensor, and further correction is possible with regard to periodicity variation in the periodic output signal of the position detecting means.

While an exemplary embodiment of the present invention has been described hereinabove, it will be apparent to those skilled in the art that various minor changes and modifications may be made therein without departing from the spirit and scope of the invention as claimed.

What is claimed is:

1. A magnetic disc apparatus comprising:
   a magnetic disc having a plurality of track groups thereon each of which comprises plural data tracks and at least two reference tracks on which a servo signal is recorded, wherein the reference tracks are recorded in the center of each of the track groups:
   transducer means for reading and writing data signals from and on the data tracks and reading the servo signal from a reference track;
   actuator means for positioning the transducer means over a desired one of the tracks;
   means connected to the transducer means for computing and generating a tracking error signal as a function of the servo signal read from the reference tracks;
   memory means for storing the tracking error signal with respect to each of the track groups;
   position sensing means for sensing the position of the transducer means relative to the magnetic disc and outputting a corresponding position signal, wherein the position sensing means generates N periodic signals, where N is an integer, which are out of phase with each other and there are N reference tracks within one track group; and
   controller means, supplied with the output of the position sensing means, for controlling the actuator means according to the stored tracking error signal corresponding to the track group within which the transducer is to be positioned.

2. A magnetic disc apparatus comprising:
   a magnetic disc having a plurality of concentric data tracks and a reference region having N concentric servo tracks on which servo signals are prerecorded, wherein N is an integer larger than 2;
   transducer means for reading and writing data signals on the data tracks and reading the servo signals from the servo tracks;
   actuator means for positioning the transducer means over a desired one of the tracks;
   position sensor means for sensing the position of the transducer means relative to the magnetic disc, and for generating N periodic position signals each of which is equally 160°/N out of phase with each other, each of the N servo tracks corresponding to each of the N periodic position signals;

computing means for computing and generating N tracking error signals according to the servo signals read from each of the servo tracks;

memory means for storing the tracking error signals;

controller means for controlling the actuator means according to the periodic position signals and the tracking error signals stored in the memory means;

temperature detecting means for detecting the temperature of the apparatus and generating a corresponding output signal; and means connected to the temperature detecting means for compensating the tracking error signals according to the output signal of the temperature detecting means and generating N compensated error signals, wherein the controller means controls the actuator means according to the compensated error signals.

3. A magnetic disc apparatus comprising:
(a) a magnetic disc having plurality of data tracks and at least two concentric reference regions each having four concentric reference tracks on which a servo signal is recorded at angularly spaced apart locations along the servo track;
(b) transducer means for reading and writing data signals from and on the data tracks and reading the servo signals from the reference tracks;
(c) actuator means for positioning the transducer means over a desired one of the tracks;
(d) means connected to the transducer means for computing and generating tracking error signals as a function of the servo signal read at any selected angular location on the reference tracks;
(e) memory means for storing the tracking error signal;
(f) position sensing means for sensing the position of the transducer means relative to the magnetic disc and outputting a corresponding position signal, wherein the position sensing means generates at least N periodic signals which are at least 90° out of phase with each other, where N is an integer equal to or greater than 2; and
(g) controller means, supplied with the output of the position sensing means, for controlling the actuator means according to the stored tracking error signal corresponding to the data track to which the transducer is to be positioned.

4. The magnetic disc apparatus as defined in claim 3, further comprising temperature detecting means for detecting the temperature of the apparatus and generating a corresponding output signal, and wherein the controller means is connected to the temperature detecting means for compensating the tracking error signals according to the output signal of the temperature detecting means and generating N compensated error signals, wherein the controller means controls the actuator means according to the compensated error signals.

5. The magnetic disc apparatus as defined in claim 4, wherein the controller means computes gradients of the error signals with respect to the tracks at individual temperatures and stores the gradients in the memory means and, after the actual temperature of the apparatus is detected by the detecting means, the error signal for a selected track is corrected in accordance with the stored gradient of the error signal at the detected temperature to produce the compensated error signal.

6. A magnetic disc apparatus comprising:
(a) a magnetic disc having a plurality of concentric data tracks and at least two reference regions each having at least four concentric reference tracks on which servo signals are circumferentially prerecorded;
(b) transducer means for reading and writing data signals on the data tracks and reading the servo signals from the servo tracks;
(c) actuator means for positioning the transducer means over a desired one of the tracks;
(d) position sensor means for sensing the position of the transducer means relative to the magnetic disc, and for generating N periodic position signals each of which is at least 90° out of phase with each other, wherein N is an integer equal to or larger than 2, the period of the periodic position signals corresponding to the reference tracks;
(e) computing means for computing and generating tracking error signals according to the servo signals read from each of the servo tracks;
(f) memory means for storing the tracking error signals; and
(g) controller means for controlling the actuator means according to the periodic position signals and the tracking error signals stored in the memory means.

7. A magnetic disc apparatus according to claim 6, wherein the magnetic disc has an additional reference region having N additional concentric servo tracks on which servo signals are circumferentially prerecorded.

* * * * *